United States Patent [19]

Tanaka et al.

[11] Patent Number: 5,621,026
[45] Date of Patent: Apr. 15, 1997

[54] GAS BARRIER FILM AND PRODUCTION PROCESS THEREOF

[75] Inventors: Hideaki Tanaka; Hiroyuki Oba; Tomoaki Sato; Tomohisa Hasegawa, all of Ibaraki-ken, Japan

[73] Assignee: Kureha Kagaku Kogyo K.K., Tokyo, Japan

[21] Appl. No.: 567,512

[22] Filed: Dec. 5, 1995

Related U.S. Application Data

[62] Division of Ser. No. 324,541, Oct. 18, 1994, Pat. No. 5,498,662.

[30] Foreign Application Priority Data

Oct. 20, 1993 [JP] Japan .................................. 5-285739
Jul. 27, 1994 [JP] Japan .................................. 6-194940

[51] Int. Cl.$^6$ ........................................................ C08L 33/02
[52] U.S. Cl. ........................ 524/52; 524/56; 524/58; 524/27; 525/54.2; 525/54.26; 528/503
[58] Field of Search ................. 525/54.2, 54.26; 524/52, 56, 58, 27; 528/503

[56] References Cited

U.S. PATENT DOCUMENTS

| | | |
|---|---|---|
| 2,169,250 | 8/1939 | Izard . |
| 4,113,854 | 9/1978 | Andrews . |
| 5,013,769 | 5/1991 | Murray . |
| 5,095,054 | 3/1992 | Lay . |

FOREIGN PATENT DOCUMENTS

| | | |
|---|---|---|
| 0608808 | 8/1994 | European Pat. Off. . |
| 51-134737 | 11/1976 | Japan . |
| 57-133142 | 8/1982 | Japan . |
| 4-90339 | 3/1992 | Japan . |
| 4-114043 | 4/1992 | Japan . |
| 4-100913 | 4/1992 | Japan . |
| 4-114044 | 4/1992 | Japan . |
| 4-132748 | 5/1992 | Japan . |
| 5-92507 | 4/1993 | Japan . |
| 5-93092 | 4/1993 | Japan . |

OTHER PUBLICATIONS

Translation of Japan 51-134737. Nov. 1976.

*Primary Examiner*—Irina S. Zemel
*Attorney, Agent, or Firm*—Lowe, Price, LeBlanc & Becker

[57] ABSTRACT

Disclosed herein is a gas barrier film formed from a mixture containing (A) at least one poly(meth)acrylic acid polymer selected from the group consisting of poly(meth)acrylic acid and partially neutralized products of poly(meth)acrylic acid and (B) a saccharide in a weight ratio of 95:5 to 20:80, and having an oxygen gas permeability coefficient of $5.00 \times 10^{-3}$ ml(STP)·cm/m$^2$·h·atm{Pa} or lower as measured under conditions of 30° C. and 80% relative humidity. A production process of the gas barrier film, in which a film is formed from the mixture, and then subjected to a heat treatment under specific conditions, is also disclosed.

12 Claims, 2 Drawing Sheets

GAS BARRIER FILM AND PRODUCTION PROCESS THEREOF

This application is a division of application Ser. No. 08/324,541 filed Oct. 18, 1994 U.S. Pat. No. 5,498,662.

FIELD OF THE INVENTION

The present invention relates to gas barrier films, and more particularly to films which are formed from a mixture containing poly(meth)acrylic acid and/or a partially neutralized product thereof and a saccharide such as starch, and excellent in water resistance and barrier property to gases such as oxygen, and a production process thereof.

The films according to the present invention are excellent in water resistance (insolubility in water and boiling water) and oxygen gas barrier property, and are hence suitable for use as packaging materials for food containing a great amount of water and/or oil, which is susceptible to deterioration with oxygen, such as oxidation, and the like

BACKGROUND OF THE INVENTION

Poly(meth)acrylic acid or partially neutralized products thereof are water-soluble polymers and widely used as water-absorbing materials, thickeners, flocculants, dispersants, treating agents for paper and fibers, and the like, making good use of their hydrophilic nature. The poly(meth)acrylic acid or partially neutralized products thereof may be formed into films from their solutions by a casting process. The resultant films are excellent in oxygen gas barrier property under dry conditions. However, these films are unsuitable for packaging of food containing a great amount of water because they show strong hydrophilic nature, and are hence markedly impaired in oxygen gas barrier property under high-humidity conditions, and moreover easy to dissolve in water.

In U.S. Pat. No. 2,169,250, it is described to polymerize a methacrylic acid monomer in an aqueous solution of polyvinyl alcohol (PVA), cast the resulting reaction mixture on a support, evaporate the water, and then heat the dry film for 5 minutes at 140° C., thereby reacting PVA with polymethacrylic acid to obtain a water-insoluble film (Example I). According to the results of an investigation by the present inventors, however, any film exhibiting excellent oxygen gas barrier property under high-humidity conditions can not be obtained by such heat treatment conditions.

On the other hand, films formed of starch are excellent in oil resistance and oxygen gas barrier property, but involve a disadvantage that they are poor in mechanical strength and water resistance. Starch is a natural polysaccharide derived from plants and is composed of straight-chain amylose in which glucose units are linked by α(1-4) glycosidic bonds, and a high molecular weight amylopectin in which a great number of short amylose units are linked in a branched structure through α(1-6) glycosidic bonds. Examples of the starch include crude starch and besides, various kinds of modified starch, such as physically modified starch such as separated and purified amylose, modified starch improved in solubility in cold water by an acid, heating, an enzyme or the like, and graft-modified starch obtained by graft-polymerizing a monomer such as acrylamide, acrylic acid, vinyl acetate or acrylonitrile. These kinds of starch are hydrophilic polymers like poly(meth)acrylic acid and used not only in a field of food industry, but also in wide fields as water-absorbing materials, thickeners, flocculants, dispersants, treating agents for paper and fibers, and the like, making good use of their hydrophilic nature. Those having excellent water solubility among these kinds of starch can easily be formed into films from aqueous solutions thereof by a casting process. However, these films are unsuitable for packaging of food containing a great amount of water because they show strong hydrophilic nature, and are hence markedly impaired in oxygen gas barrier property under high-humidity conditions.

Some proposals have recently been made for producing films or sheets from mixtures of the starch and various thermoplastic resins. For example, there have been proposed biodegradable molded laminates in which a thin layer of a saponified product of an ethylene-vinyl acetate copolymer is provided on at least one side of a product molded from a mixture of a thermoplastic resin such as polyethylene and a starch polymer, such as a film (Japanese Patent Application Laid-Open No. 90339/1992), biodegradable films formed from a mixture of a PVA polymer and starch (Japanese Patent Application Laid-Open Nos. 100913/1992 and 114044/1992), water-resistant compositions composed of a PVA resin and a polysaccharide and films formed from such a composition (Japanese Patent Application Laid-Open No. 114043/1992), and sheets or films formed from a composition of a saponified product of an ethylene-vinyl acetate copolymer and starch, or laminates thereof (Japanese Patent Application Laid-Open Nos. 132748/1992, 93092/1993 and 92507/1993. However, these films are still insufficient in water resistance or oxygen gas barrier property under high-humidity conditions.

OBJECTS AND SUMMARY OF THE INVENTION

It is an object of the present invention to provide a film having good water resistance and exhibiting excellent oxygen gas barrier property even under high-humidity conditions.

The present inventors have carried out an extensive investigation with a view toward overcoming the above-described problems involved in the prior art. As a result, it has been found that when a film is formed from a mixture of poly(meth)acrylic acid and/or a partially neutralized product thereof and a saccharide (monosaccharide, oligosaccharide, polysaccharide or the like), and the resulting film is subjected to a heat treatment under specific conditions, a film exhibiting remarkably improved oxygen gas barrier property (oxygen gas permeability coefficient) even under high-humidity conditions to say nothing of dry conditions compared with films formed from the individual components can be obtained. This heat-treated film is insoluble in water and boiling water, and also excellent in water resistance, and hence fully suitable for use as a packaging material for food containing a great amount of water and/or oil.

The present invention has been led to completion on the basis of this finding.

According to the present invention, there is thus provided a gas barrier film formed from a mixture containing (A) at least one poly(meth)acrylic acid polymer selected from the group consisting of poly(meth)acrylic acid and partially neutralized products of poly(meth)acrylic acid and (B) a saccharide in a weight ratio of 95:5 to 20:80, and having an oxygen gas permeability coefficient of $5.00 \times 10^{-3}$ ml(STP)·cm/m$^2$·h·atm{Pa} or lower as measured under conditions of 30° C. and 80% relative humidity.

According to the present invention, there is also provided a process for the production of a gas barrier film, which comprises forming a film from a mixture containing (A) at least one poly(meth)acrylic acid polymer selected from the group consisting of poly(meth)acrylic acid and partially neutralized products of poly(meth)acrylic acid and (B) a saccharide in a weight ratio of 95:5 to 20:80, and then subjecting the film to a heat treatment under conditions in which the heat-treating temperature and the heat-treating time satisfy the following relationships (a) and (b):

(a) $\log t \geq -0.0622 \times T + 28.48$ (b) $373 \leq T \leq 573$ wherein t means the heat-treating time (min), and T denotes the heat-treating temperature (K).

DETAILED DESCRIPTION OF THE INVENTION

The present invention will hereinafter be described in detail.

<Poly(meth)acrylic acid polymer>

The poly(meth)acrylic acid useful in the practice of this invention is a compound having at least two carboxylic groups in its molecule. Specific examples thereof include polyacrylic acid, polymethacrylic acid, copolymers of acrylic acid and methacrylic acid, and mixtures of at least two polymers thereof. Homopolymers of acrylic acid or methacrylic acid, and copolymers thereof are preferred. Of these, homopolymers of acrylic acid and copolymers of a predominant amount of acrylic acid with methacrylic acid are particularly preferred from the viewpoint of the improvement in oxygen gas barrier property. No particular limitation is imposed on the number average molecular weight of the poly(meth)acrylic acid. However, it preferably falls within a range of from 2,000 to 250,000.

The partially neutralized product of the poly(meth)acrylic acid can be obtained by partially neutralizing the carboxyl groups of the poly(meth)acrylic acid with an alkali (namely, forming a carboxylate). As examples of the alkali, may be mentioned alkali metal hydroxides such as sodium hydroxide, lithium hydroxide and potassium hydroxide, ammonium hydroxide, etc. The partially neutralized product can be generally obtained by adding the alkali to an aqueous solution of the poly(meth)acrylic acid to react them. This partially neutralized product is provided as an alkali metal salt, ammonium salt or the like.

A desired degree of neutralization can be achieved by controlling the quantitative ratio of the poly(meth)acrylic acid to the alkali. The degree of neutralization of the partially neutralized poly(meth)acrylic acid is preferably selected on the basis of the degree of oxygen gas barrier property of the resulting film. The oxygen gas barrier property shows a tendency to deteriorate when the degree of neutralization increases beyond a certain point.

Although the oxygen gas barrier property of the film according to the present invention is affected by heat-treating conditions and the mixing ratio between both components, it is also influenced by the degree of neutralization of the poly(meth)acrylic acid. More specifically, in a case where the degree of neutralization exceeds 0%, but is not higher than 20%, a film having excellent oxygen gas barrier property as demonstrated by an oxygen permeability of 400 ml(STP)/m$^2$·day·atm{Pa} or lower as measured under conditions of a film thickness of 3 μm, a temperature of 30° C. and a relative humidity (RH) of 80% can be obtained by selecting the heat-treating conditions and the mixing ratio between both components. In a case where the degree of neutralization exceeds 20%, however, the oxygen gas barrier property shows a tendency to deteriorate. In particular, in a case where the degree of neutralization of the partially neutralized poly(meth)acrylic acid is 15% or lower, films markedly improved in oxygen gas barrier property compared with the case making use of unneutralized poly(meth)acrylic acid can be provided in a wide range of the mixing ratio between both components. It is therefore desirable that the degree of neutralization of the partially neutralized poly(meth)acrylic acid be generally within a range higher than 0%, but not higher than 20%, preferably a range higher than 0%, but not higher than 18%, more preferably a range of 5–15% from the viewpoint of the improvement in oxygen gas barrier property.

The degree of neutralization is determined by the following equation:

$$\text{Degree of neutralization} = (X/Y) \times 100$$

wherein X means the number of moles of carboxyl groups neutralized in 1 g of the partially neutralized poly(meth)acrylic acid, and Y denotes the number of moles of carboxyl groups in 1 g of the poly(meth)acrylic acid before the partial neutralization.

<Saccharide>

In the present invention, monosaccharides, oligosaccharides and polysaccharides are used as the saccharide (also referred to as carbohydrate). These saccharides also include sugar alcohols and various substitution products and derivatives of the saccharides. These saccharides are preferably soluble in water.

Monosaccharide

Monosaccharides are basic substances of saccharides, which are not decomposable to simpler molecules by hydrolysis, and serve as constitutive units of oligosaccharides and polysaccharides. The monosaccharides are generally represented by the general formula, $C_nH_{2n}O_n$. Of these, the monosaccharide in which the number of carbon atoms (n) is 2, 3, 4, 5, 6, 7, 8, 9 or 10 is referred to as diose, triose, tetrose, pentose, hexose, heptose, octose, nonose or decose.

The monosaccharides are classified into aldoses having an aldehyde group and ketoses having a ketone group. Those in which n is 3 or more have at least one asymmetric carbon atom. Therefore, many stereoisomers may exist according to the number of asymmetric carbon atoms. However, only part of the stereoisomers are known in nature. Many of the monosaccharides existing in nature are pentose and hexose.

As the monosaccharide used in the present invention, aldoses which are aldehydes of a chain polyhydric alcohol of n=5 or more are preferred because they exist naturally in plenty. Examples of such monosaccharides include glucose, mannose, galactose and xylose. Of these, glucose and galactose are more preferred. These monosaccharides may be used either singly or in any combination thereof.

Sugar Alcohol

Sugar alcohols are polyhydroxyalkanes obtained by reducing aldoses or ketoses.

As the sugar alcohol used in the present invention, chain polyhydric alcohols are preferred. Such sugar alcohols may be represented by the general formula, $C_nH_{2n+1}O_n$. The sugar alcohol in which n is 3, 4, 5, 6, 7, 8, 9 or 10 is referred to as tritol, tetritol, pentitol, hexitol, heptitol, octitol, nonitol or decitol. In the individual sugar alcohols, many stereoisomers exist according to the number of asymmetric carbon atoms.

In the present invention, the sugar alcohols of n=3–6 may preferably be used. As specific examples of the sugar alcohols, may be mentioned sorbitol, mannitol, dulcitol, xylitol, erythritol and glycerol. The sugar alcohols may be used either singly or in any combination thereof.

Oligosaccharide

Compounds having a structure that 2 to about 10 monosaccharide units have been linked by glycosidic bonds are referred to as oligosaccharides. The oligosaccharides are classified into disaccharides, trisaccharides, tetrasaccharides, pentasaccharides and the like according to the number of monosaccharide units linked. As specific examples thereof, may be mentioned sucrose, lactose, trehalose, cellobiose, maltose, raffinose and stachyose. Those (terminal-alcoholized oligosaccharides) obtained by alcoholizing these oligosaccharides at their terminals may also be used.

Polysaccharide

Polysaccharide is a generic name for high molecular compounds (polymerization degree: 10 or higher) in which at least one monosaccharide has been polymerized by glycosidic bonds. Of these, a polymer composed of one kind of monosaccharide unit is referred to as a homopolysaccharide (homoglycan), while a polymer composed of two or more kinds of monosaccharide units is referred to as a heteropolysaccharide (hetroglycan). The polysaccharides widely exists as reserve polysaccharides (starch and the like), structural polysaccharides (cellulose and the like) and functional polysaccharides (heparin and the like) in the animal, plant and microorganism kingdoms.

Natural polysaccharides are high molecular compounds principally containing, as constitutive units, aldohexose and aldopentose which have been linked in a linear, branched or cyclic structure by glycosidic bonds. Each of aldopentose and aldohexose forms a 6-membered ring structure called a pyranose ring by intramolecular hemiacetal linking between the aldehyde group at the $C_1$ position and the hydroxyl group at the $C_5$ position. Aldohexose and aldopentose in a molecule of the natural polysaccharides principally have this pyranose ring structure.

Aldohexose and aldopentose which are constitutive units of the natural polysaccharides include, in addition to neutral monosaccharides, the sulfuric esters, phosphoric esters and other organic acid esters of the neutral monosaccharides, methyl ethers of the neutral monosaccharides, uronic acids in which only the primary hydroxyl group in a monosaccharide has been oxidized into a carboxyl group, hexosamine in which the hydroxyl group at the $C_2$ position in aldohexose has been substituted by an amino group, and N-acetylhexosamine as its derivative, and 3,6-etherified aldohexose obtained by dehydration reaction between the hydroxyl groups at the C3 and C6 positions.

The natural polysaccharides are widely distributed in the animal and plant kingdoms, and exist in plants as constitutive components for cell walls of higher plants and seaweeds, and constitutive components for cells of microorganisms, which are not involved in constituting the cell walls. The natural polysaccharides which are not involved in constituting the cell walls of higher plants and seaweeds include mucilage contained in cell sap and reserve substances such as starch. In the animal kingdom, they exist as reserve substances such as glycogen and constitutive components for mucus such as heparin and chondroitin sulfate.

The natural polysaccharides are classified into neutral polysaccharides, acid polysaccharides and basic polysaccharides according to their constitutive components. The neutral polysaccharides include mannan and glucan as homopolysaccharides. Besides, as heteropolysaccharides, those composed of only hexose are contained in konjak and guaran, while those composed of only pentose are contained in xylan and araboxylan. On the other hand, those containing both hexose and pentose are known to be contained in tamarind. With respect to the acid polysaccharides, those containing uronic acid alone, and those containing galacturonic acid and neutral monosaccharides, or glucuronic acid and neutral monosaccharides include *Hibiscus manihot* and pectin, and chamomile and *Asparagus cochinchinensis*, respectively. Besides, there are acid polysaccharides containing the sulfuric esters, phosphoric esters, other organic acid esters or methyl ethers of neutral monosaccharides, or the 3,6-etherified aldohexose. Basic polysaccharides include those containing, as a constitutive component, glucosamine or galactosamine.

The polysaccharides used in the present invention include, in addition to these natural polysaccharides, those obtained by hydrolyzing these polysaccharides in a solid or liquid phase, or a solid-liquid mixed phase using, as a catalyst, an organic acid, an inorganic acid, or a hydrolase for the individual polysaccharides, if necessary, under heat, and those obtained by further modifying the natural polysaccharides and the hydrolyzates thereof.

Exemplary modifications of the natural polysaccharides and the hydrolyzates thereof include:

(1) esterification with an inorganic or organic acid, or etherification such as allyl etherification, methyl etherification or carboxymethyl etherification;

(2) cationizing treatment: for example, a reaction of the natural polysaccharide or a hydrolyzate thereof with 2-diethylaminoethyl chloride or 2,3-epoxypropyl-trimethylammonium chloride;

(3) crosslinking treatment: for example, crosslinking making use of formaldehyde, epichlorohydrin, phosphoric acid or acrolein; and (4) grafting treatment: for example, graft polymerization of the natural polysaccharide or a hydrolyzate thereof with various kinds of monomers. Examples of the monomers include vinyl acetate, vinyl propionate, t-butyl vinyl ether, (meth)acrylamide, (meth)acrylic acid, alkyl (meth)acrylates, hydroxyalkyl (meth)acrylates, ethoxyalkyl (meth)acrylates, methoxypolyethylene glycol (meth)acrylate, 2-hydroxy-3-chloropropyl (meth)acrylate, dimethylaminoethyl (meth)acrylate, glycidyl methacrylate, acrylonitrile, styrene, maleic anhydride and itaconic acid.

Among these natural polysaccharides and hydrolyzates thereof, and modified products thereof, those soluble in water are preferred. Of the water-soluble natural polysaccharides and hydrolyzates thereof, and modified products thereof, homopolysaccharides comprising, as a constitutive component, glucose or its derivatives are more preferred. Examples of the homopolysaccharides composed of glucose include starch, cellulose, dextran, pullulan, water-soluble chitin and chitosan.

In the present invention, their corresponding sugar alcohols may be used in place of the natural polysaccharides and hydrolyzates thereof, and modified products thereof. In this specification, the sugar alcohols of the natural polysaccharides and hydrolyzates thereof, and modified products thereof mean those in which the carbonyl group at the $C_1$ position of a reducible terminal in each polymer has been reduced into an alcohol. Besides, saccharides such as cyclodextrin, in which molecular chains of monosaccharides are cyclically linked, may also be used in the present invention. The polysaccharides used in this invention may be used either singly or in any combination thereof.

Starch

Starch is included in the above-described polysaccharides. However, the starch used in the present invention will hereinafter be described in more detail.

The starch used in the present invention includes crude starch (unmodified starch) such as wheat starch, corn starch, waxy corn starch, potato starch, tapioca starch, rice starch, sweet potato starch and sago, and besides various kinds of modified starch.

Examples of the modified starch include (1) physically modified starch such as α-starch, separated and purified amylose, separated and purified amylopectin, and wet-heat treated starch, (2) enzyme-modified starch such as hydrolyzed dextrin, enzymolyzed dextrin and amylose, (3) chemically decomposed and modified starch such as acid-treated starch, hypochlorous acid-oxidized starch and starch dialdehyde, (4) chemically modified starch such as esterified starch (starch acetate, starch succinate, starch nitrate, starch phosphate, starch urea phosphate, starch xanthate, starch acetoacetate, etc.), etherified starch (starch allyl ether, starch methyl ether, starch carboxymethyl ether, starch hydroxyethyl ether, starch hydroxypropyl ether, etc.), cationic starch (a reaction product of starch with 2-diethylaminoethyl chloride, a reaction product of starch with 2,3-epoxypropyltrimethyl-ammonium chloride, etc.), and crosslinked starch (formaldehyde-crosslinked starch, epichlorohydrin-crosslinked starch, phosphoric acid-crosslinked starch, acrolein-crosslinked starch, etc.), and (5) graft-modified starch obtained by graft-polymerizing a monomer on various kinds of starch [exemplary monomers include vinyl acetate, vinyl propionate, t-butyl vinyl ether, (meth)acrylamide, (meth)acrylic acid, alkyl (meth)acrylates, hydroxyalkyl (meth)acrylates, ethoxyalkyl (meth)acrylates, methoxypolyethylene glycol (meth)acrylate, 2-hydroxy-3-chloropropyl (meth)acrylate, dimethylaminoethyl (meth)acrylate, glycidyl methacrylate, acrylonitrile, styrene, maleic anhydride and itaconic acid].

Of these kinds of starch, modified starch soluble in water is preferred. The starch may contain water. These kinds of starch may be used either singly or in any combination thereof.

<Preparation of mixture and film-forming process>

In order to obtain a mixture of the poly(meth)acrylic acid polymer and the saccharide, there is used a method in which both components are dissolved in water, a method in which aqueous solutions of the respective components are mixed, a method in which a (meth)acrylic acid monomer is polymerized in an aqueous solution of the saccharide, and the resulting polymer is then neutralized with an alkali if desired, or the like. When the poly(meth)acrylic acid polymer and the saccharide are dissolved in water, an intimate mixture solution can be provided. Besides water, a solvent such as alcohol or a mixed solvent water and alcohol or the like may be used.

No particular limitation is imposed on the process for forming films from these mixtures. However, exemplary film-forming processes include a process (solvent casting) in which an aqueous solution of the mixture is cast on a support such as a glass plate or plastic film, and the mixture is dried to form a film, a process (extrusion) in which a liquid with the mixture dissolved in water in a high concentration is cast by an extruder in the form of a film through a thin slit while applying a discharge pressure, and the resulting water-containing film is dried on a rotating drum or belt, and the like. Of these film-forming processes, the solvent casting process is preferred because a dry film excellent in transparency can be obtained with ease.

In the case where the solvent casting process is used, the solids concentration of the solution is generally adjusted to about 1–30 wt. %. When the aqueous solution or the liquid with the mixture dissolved in water in a high concentration is prepared, solvents other than water, such as alcohol, flexibilizers, and the like may suitably be added if desired. A flexibilizer, a heat stabilizer and/or the like may also be incorporated into at least one of the components in advance. No particular limitation is imposed on the thickness of the film, and it may hence be suitably determined as necessary for the end application intended. However, it may be generally of the order of 0.1–500 μm, preferably 0.5–100 μm.

Figure 1:
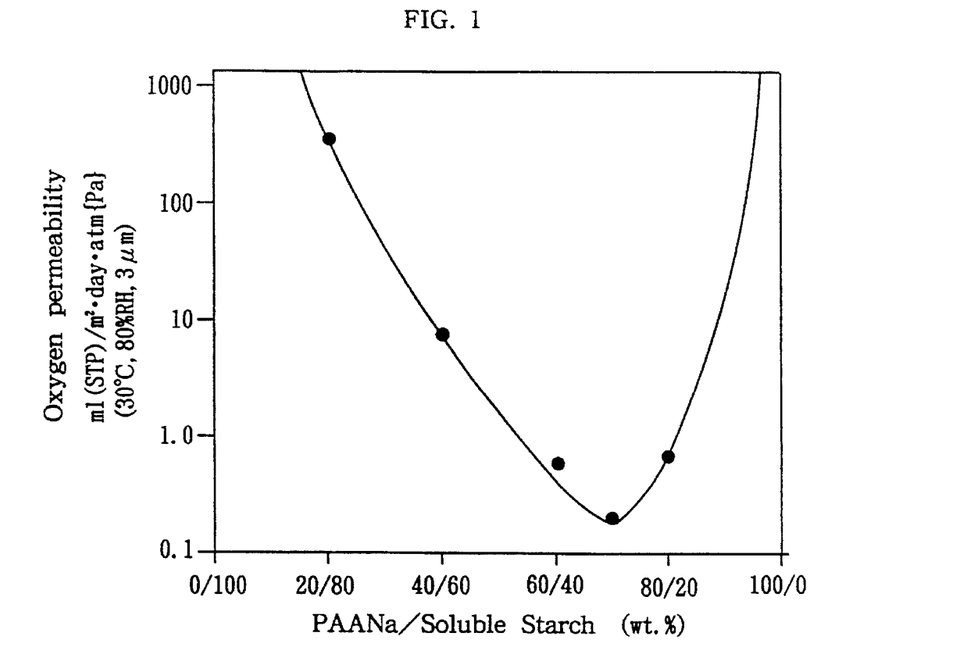
FIG. 1 is a graph showing a relationship between the weight ratio of a partially neutralized product of polyacrylic acid (PAA) to soluble starch and oxygen permeability as to heat-treated films obtained with the mixing ratio of the partially neutralized product of PAA to the soluble starch varied.

The mixing ratio by weight of the poly(meth)acrylic acid polymer to the saccharide is 95:5 to 20:80, preferably 90:10 to 40:60, more preferably 85:15 to 50:50 from the viewpoint of the improvement in oxygen gas barrier property. In Table 1 which will be described subsequently, are shown data obtained by measuring oxygen permeabilities (at 30° C. and 80% RH) of films (thickness: 3 μm), which have been obtained by changing the mixing ratio of a partially neutralized product (PAANa, degree of neutralization: 10%) of polyacrylic acid (PAA) to soluble starch to provide dry films of various compositions according to the solvent casting process, and subjecting them to a heat treatment at 200° C. for 15 minutes. The data are also graphically illustrated in FIG. 1. As apparent from Table 1 and FIG. 1, it is understood that when the mixing proportion of PAANa falls within a range of 20–95 wt. %, preferably 40–90 wt. %, more preferably 50–85 wt. %, films exhibiting excellent oxygen gas barrier property even under high-humidity conditions can be provided.

<Heat treatment>

In order to obtain a film having excellent water resistance and oxygen gas barrier property from a mixture of the poly(meth)acrylic acid polymer and the saccharide, it is necessary to conduct a heat treatment under specific conditions after the formation of a film. In Table 2 which will be described subsequently, are shown data obtained by measuring oxygen permeabilities (at 30° C. and 80% RH) of heat-treated films, which have been obtained by forming dry films (thickness: 3 μm) from an aqueous solution of a mixture of a partially neutralized product (PAANa, degree of neutralization: 10%) of polyacrylic acid and soluble starch in a weight ratio of 70:30 according to the solvent casting process and separately subjecting the dry films to a heat treatment with heat-treating temperature and heat-treating time varied. The data are also graphically illustrated in FIG. 2.

Figure 2:
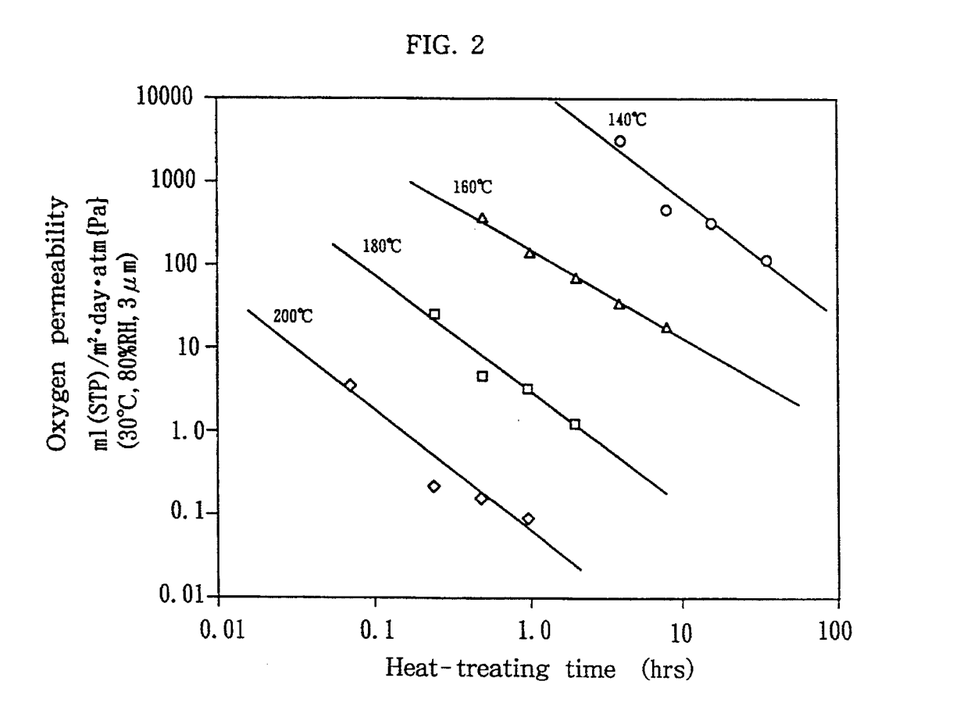
FIG. 2 is a graph showing a relationship among heat-treating temperature, heat-treating time and oxygen permeability as to heat-treated films formed from a mixture of a partially neutralized product of PAA and soluble starch and obtained by changing the heat-treating temperature.

As apparent from Table 2 and FIG. 2, when a film low in oxygen permeability is intended to form, the treating time may be relatively short if the heat-treating temperature is high. However, it takes longer time as the heat-treating temperature becomes low. In order to provide a film practically usable even under high-humidity conditions, it is desirable that the oxygen permeability of the film be 400 ml(STP)/m²·day·atm{Pa} or lower as measured under conditions of film thickness of 3 μm, 30° C. and 80% RH. This oxygen gas permeability corresponds to an oxygen gas permeability coefficient of $5.00\times10^{-3}$ ml(STP)·cm/m²·h·atm{Pa} or lower. Therefore, the arrangement of the experimental data on the heat-treating temperature, heat-treating time and oxygen permeability has revealed that in order to achieve this oxygen gas permeability coefficient by a film formed from a mixture of the poly(meth)acrylic acid polymer and the starch, the film must be subjected to a heat treatment under conditions in which the heat-treating temperature and the heat-treating time satisfy the following relationships (a) and (b):

(a) $\log t \geq -0.0622\times T + 28.48$ (b) $373 \leq T \leq 573$ wherein t means the heat-treating time (min) and T denotes the heat-treating temperature (K).

The use of these heat-treating conditions permits the provision of a film formed from a mixture of the poly(meth)acrylic acid polymer and the saccharide, and having excellent oxygen gas barrier property as demonstrated by an oxygen gas permeability coefficient of $5.00\times10^{-3}$ ml(STP)·cm/m²·h·atm{Pa} or lower as measured under conditions of 30° C. and 80% RH.

In the present invention, to achieve a preferable oxygen permeability of 100 ml(STP)/m²·day·atm{Pa} or lower as measured under conditions of 30° C. and 80% RH (film thickness: 3 μm), it is only necessary to use heat-treating conditions satisfying the following relationship (c) in place of those satisfying the relationship (a):

(c) $\log t \geq -0.0631\times T + 29.32$ wherein T satisfies the relationship (b).

The use of the heat-treating conditions satisfying the relationship (c) permits the provision of a film having an oxygen gas permeability coefficient (at 30° C. and 80% RH) of $1.25\times10^{-3}$ ml(STP)·cm/m²·h·atm{Pa} or lower.

Similarly, to achieve a more preferable oxygen permeability of 10 ml(STP)/m²·day·atm{Pa} or lower as measured under conditions of 30° C. and 80% RH (film thickness: 3 μm), it is only necessary to use heat-treating conditions satisfying the following relationship (d) in place of those satisfying the relationship (a):

(d) $\log t \geq -0.0645\times T + 30.71$ wherein T satisfies the relationship (b).

The use of the heat-treating conditions satisfying the relationship (d) permits the provision of a film having an oxygen gas permeability coefficient (at 30° C., 80% RH) of $1.25\times10^{-4}$ ml(STP)·cm/m²·h·atm{Pa} or lower.

Incidentally, the oxygen gas permeability coefficient [ml(STP)·cm/m²·h·atm{Pa}] of a film can be found by multiplying the oxygen permeability [ml(STP)/m²·day·atm{Pa}] of the film as measured under conditions of a film thickness of 3 μm by $1.25\times10^{-5}$·cm.

The heat-treating temperature (T) is selected from a range of from 100° C. (373 K) to 300° C. (573 K). However, it takes a very long heat-treating time for obtaining a film high in oxygen gas barrier property if the heat-treating temperature falls within a lower temperature range, resulting in reduction of productivity. High oxygen gas barrier property can be achieved in a shorter heat-treating time as the heat-treating temperature becomes high. However, if the temperature is too high, there is a possibility that discoloration and/or decomposition may occur. Accordingly, the heat-treating temperature is preferably within a range of from 120° C. (393 K) to 280° C. (553 K), more preferably 160° C. (433 K) to 250° C. (523 K). The upper limit of the heat-treating time is determined to a range in which a film to be treated is not decomposed or melted at a predetermined heat-treating temperature.

The heat treatment may be conducted, for example, by placing a film or a laminate of a support and the film for a predetermined period of time into an oven controlled at a predetermined temperature. Alternatively, the heat treatment may be continuously conducted by causing the film or laminate to pass through the oven controlled at the predetermined temperature within the fixed period of time.

The use of the heat-treating conditions according to the present invention permits the provision of a film exhibiting high oxygen gas barrier property even under high-humidity conditions from a mixture of the poly(meth)acrylic acid polymer and the saccharide. This film is also insoluble in water and boiling water, and hence has good water resistance. The gas barrier film according to the present invention is suitable for use particularly in the field of food packaging materials in the form of a single film or a laminate film with one or more other films.

ADVANTAGES OF THE INVENTION

According to the present invention, there are provided films, which are formed from a mixture of poly(meth)acrylic acid and/or a partially neutralized product thereof and a saccharide, and are good in water resistance (insolubility in water and boiling water) and far excellent in gas barrier property under high-humidity conditions, by a heat treatment under the specific heat-treating conditions.

The films according to the present invention are particularly suitable for use, as food packaging materials, in packaging food and drink liable to be deteriorated by oxygen, for example, meat, processed meat products such as hams and sausages, juices, soda pop, etc.

EMBODIMENTS OF THE INVENTION

The present invention will hereinafter be described more specifically by the following examples and comparative examples. It should however be borne in mind that the present invention is not limited to the following examples only.

Example 1 and Comparative Examples 1–4

A 25 wt. % aqueous solution of polyacrylic acid (product of Wako Pure Chemical Industries, Ltd., viscosity: 8,000–12,000 cPs at 30° C., number average molecular weight: 150,000) was used as polyacrylic acid (PAA) to prepare a 10 wt. % aqueous solution by diluting with water. Sodium hydroxide in a calculated amount to the number of moles of carboxyl groups in PAA was added to the 10 wt. % aqueous solution of PAA to dissolve it in the solution, thereby preparing an aqueous solution of a partially neutralized product (PAANa) having a degree of neutralization (DN) of 10%. On the other hand, soluble starch (product of Wako Pure Chemical Industries, Ltd., water-soluble starch obtained by hydrolyzing potato starch with an acid) was used as starch to prepare a 10 wt. % aqueous solution thereof.

The above-prepared aqueous PAANa solution and aqueous soluble starch solution were mixed to give such various weight ratios (in terms of solids) as shown in Table 1, thereby preparing aqueous mixture solutions (concentration: 10 wt. %). These aqueous solutions were separately coated by a Meyer bar using a bench coater, K 303 PROOFER (trade name, manufactured by RK Print-Coat Instruments, Ltd.) on stretched polyethylene terephthalate films (stretched PET films 16 μm thick), and water was then evaporated by a dryer, thereby obtaining dry films 3 μm thick. The stretched PET films on which these dry films had been separately formed were fixed to a cardboard with an adhesive vinyl tape to subject them to a heat treatment at 200° C. for 15 minutes in an oven. Oxygen permeabilities measured under conditions of 30° C. and 80% RH on the heat-treated films (thickness: 3 μm) thus obtained are shown in Table 1.

For the sake of comparison, oxygen permeabilities of a heat-treated film (Comparative Example 1) obtained by using PAA alone and treating it in the same manner as described above, a heat-treated film (Comparative Example 2) obtained by using PAANa alone and treating it in the same manner as described above, a heat-treated film (Comparative Example 3) obtained by using the soluble starch alone and treating it in the same manner as described above, and a film (Comparative Example 4) formed of a mixture of PAANa and the soluble starch and subjected to no heat treatment are also shown collectively in Table 1. The results shown in Table 1 are also graphically illustrated in FIG. 1.

<Measurement of oxygen permeability>

The oxygen permeability of each of the coating films was determined by separately measuring oxygen permeabilities of the stretched PET film and a laminate (the stretched PET film on which the film has been formed) by means of an oxygen permeability tester, OX-TRAN 2/20 (trade name) manufactured by Modern Control Company, and calculating the oxygen permeability, $P_{film}$ of the coating layer (film) in accordance with the following equation:

$$1/P_{total} = 1/P_{film} + 1/P_{PET}$$

wherein $P_{total}$: oxygen permeability of the stretched PET film on which the film has been formed;

$P_{film}$: oxygen permeability of the film; and $P_{PET}$: oxygen permeability of the stretched PET film.

<Water resistance>

The water resistance of each film was evaluated by immersing the film for 10 minutes in boiling water (95° C.) and observing whether the film was soluble therein or not.

PAANa:starch ranging from 95:5 to 20:80, preferably from 90:10 to 40:60, more preferably from 85:15 to 50:50. On the other hand, the heat-treated films (Comparative Examples 1–3) obtained by singly using PAA, PAANa and soluble starch were very high in oxygen permeability. The film (Comparative Example 4) which was formed from the mixture of PAANa and the soluble starch, but not subjected to the heat treatment exhibited a very high oxygen permeability. All the heat-treated films according to Example 1 were insoluble in boiling water, while all the films according to Comparative Examples 1–4 were soluble in boiling water.

Example 2 and Comparative Example 5

An aqueous solution (concentration: 10 wt. %) containing a partially neutralized product (PAANa, DN=10%) of the same polyacrylic acid as that used in Example 1 and the same soluble starch as that used in Example 1 in a weight ratio of 70:30 was used to form a coating film on stretched PET film in the same manner as in Example 1. Portions of the stretched PET film on which the film had been formed were separately subjected to a heat treatment with heat-treating temperature and heat-treating time varied as shown in Table 2. The oxygen permeability of each of the heat-treated film portions was measured under conditions of a film thickness of 3 μm, 30° C. and 80% RH. The results are shown in Table 2. The results shown in Table 2 are also graphically illustrated in FIG. 2.

Incidentally, all the films obtained under conditions of 140° C. for 16 hours, 140° C. for 32 hours, 160° C., 180° C. and 200° C. among the conditions shown in Table 2 were insoluble in boiling water. On the other hand, the films obtained under conditions of 140° C. for 4 hours and 140° C. for 8 hours were soluble in boiling water.

TABLE 2

| Heat-treating conditions | | Oxygen permeability ml(STP)/m² · day · atm{Pa} |
|---|---|---|
| Temperature | Time | (30° C., 80% RH, 3 μm) |
| 140° C. | 4 hours | 3200 |
|  | 8 hours | 490 |

TABLE 1

| | Composition (wt. %) | | | Heat treatment (200° C. × 15 min) | Oxygen permeability (30° C., 80% RH, 3 μm) ml(STP)/ m² · day · atm{Pa} |
|---|---|---|---|---|---|
| | PAA | PAANa | Soluble starch | | |
| Ex. 1 | — | 20 | 80 | Conducted | 380 |
| | — | 40 | 60 | Conducted | 7.8 |
| | — | 60 | 40 | Conducted | 0.6 |
| | — | 70 | 30 | Conducted | 0.2 |
| | — | 80 | 20 | Conducted | 0.7 |
| Comp. Ex. 1 | 100 | — | — | Conducted | >5000 |
| Comp. Ex. 2 | — | 100 | — | Conducted | >5000 |
| Comp. Ex. 3 | — | — | 100 | Conducted | >5000 |
| Comp. Ex. 4 | — | 70 | 30 | Not Conducted | >5000 |

As apparent from Table 1, it is understood that films exhibiting excellent gas barrier property even under high-humidity conditions can be obtained in a weight ratio of TABLE 2-continued

| Heat-treating conditions | | Oxygen permeability ml(STP)/m² · day · atm{Pa} |
|---|---|---|
| Temperature | Time | (30° C., 80% RH, 3 μm) |
| | 16 hours | 320 |
| | 32 hours | 120 |
| 160° C. | 30 minutes | 350 |
| | 1 hour | 140 |
| | 2 hours | 69 |
| | 4 hours | 35 |
| | 8 hours | 18 |
| 180° C. | 15 minutes | 27 |
| | 30 minutes | 4.8 |
| | 1 hour | 3.4 |
| | 2 hours | 1.3 |
| 200° C. | 5 minutes | 3.50 |
| | 15 minutes | 0.22 |
| | 30 minutes | 0.16 |
| | 1 hour | 0.09 |

With respect to the relationship between oxygen permeability (P) and heat-treating time (t: min), a linear regression line between log P and log t was prepared in each heat-treating temperature from the data shown in Table 2 in accordance with a method known per se in the art. The results are illustrated in FIG. 2. In each heat-treating temperature, heat-treating time, log t for which the oxygen permeability came to 10, 100 or 400 ml(STP)/m²·day·atm{Pa} was then calculated out. Further, a linear regression line as to the relationship between the heat-treating temperature (T) and log t was prepared on the basis of this calculated result.

Heat-treating conditions under which the oxygen permeability (at 30° C. and 80% RH, thickness of 3μm) came to 400 ml(STP)/m²·day·atm{Pa} or lower were found from the results of the regression analysis obtained above. As a result, the following relationship was found.

(a) $\log t \geq -0.0622 \times T + 28.48$ wherein t means the heat-treating time (min), and T denotes the heat-treating temperature (K).

Taking the coloring of the film, the decomposition-melting of the components, etc. into consideration, the range of the heat-treating temperature comes to $373 \leq T \leq 573$.

The use of these heat-treating conditions permits the provision of films improved in gas barrier property as demonstrated by an oxygen gas permeability coefficient of $5.00 \times 10^{-3}$ ml(STP)·cm/m²·h·atm{Pa} or lower as measured under conditions of 30° C. and 80% RH.

Similarly, to achieve a preferable oxygen permeability of 100 ml(STP)/m²·day·atm{Pa} or lower as measured under conditions of a film thickness of 3 μm, 30° C. and 80% RH, it is only necessary to use heat-treating conditions satisfying the following relationship (c):

(c) $\log t \geq -0.0631 \times T + 29.32$.

The use of the heat-treating conditions satisfying the relationship (c) permits the provision of films each having an oxygen gas permeability coefficient (at 30° C. and 80% RH) of $1.25 \times 10^{-3}$ ml(STP)·cm/m²·h·atm{Pa} or lower.

Similarly, to achieve a more preferable oxygen permeability of 10 ml(STP)/m²·day·atm{Pa} or lower as measured under conditions of a film thickness of 3 μm, 30° C and 80% RH, it is only necessary to use heat-treating conditions satisfying the following relationship (d):

(d) $\log t \geq -0.0645 \times T + 30.71$

The use of the heat-treating conditions satisfying the relationship (d) permits the provision of films each having an oxygen gas permeability coefficient (at 30° C. and 80% RH) of $1.25 \times 10^{-4}$ ml(STP)·cm/m²·h·atm{pa} or lower.

Example 3 and Comparative Example 6

Aqueous solutions (concentration: 10 wt. %) containing any one of partially neutralized products (PAANa, DN=0–50%) of the same polyacrylic acid as that used in Example 1, which were different in degree of neutralization, and the soluble starch in a weight ratio of 70:30 were separately used to form coating films on stretched PET films in the same manner as in Example 1. The thus-formed films were heat-treated at 200° C. for 15 minutes. The oxygen permeability of each of the heat-treated films thus obtained was then measured under conditions of a film thickness of 3 μm, 30° C. and 80% RH. The results are shown in Table 3. The results shown in Table 3 are also graphically illustrated in FIG. 3.

Incidentally, all the films obtained by separately using the partially neutralized products of the polyacrylic acid, which had degrees of neutralization (DN) of 0, 10 and 20%, respectively, were insoluble in boiling water. On the other hand, the film obtained by using the partially neutralized products of the polyacrylic acid, which had a degree of neutralization (DN) of 50%, was soluble in boiling water.

TABLE 3

| Degree of neutralization (%) | Oxygen permeability (30° C., 80% RH, 3 μm) ml(STP)/m² · day · atm{Pa} |
|---|---|
| 0 | 25 |
| 10 | 0.2 |
| 20 | 320 |
| 50 | 1560 |

Figure 3:
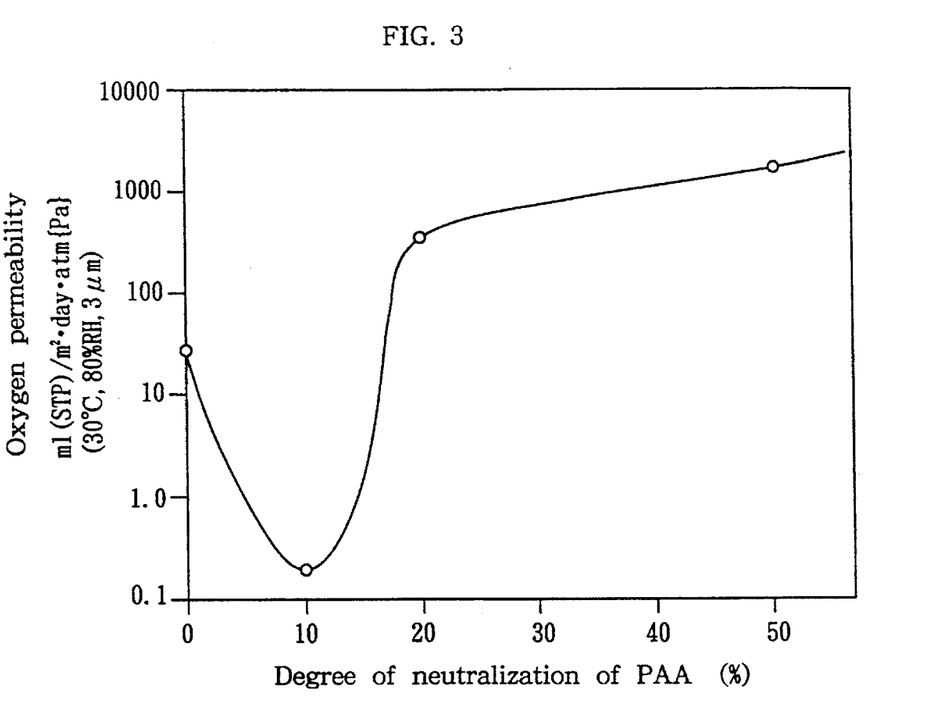
FIG. 3 is a graph showing a relationship between the degree of neutralization of PAA and oxygen permeability as to heat-treated films formed from mixtures of a partially neutralized product of PAA and soluble starch.

As apparent from the results shown in Table 3 and FIG. 3, it is understood that the use of the poly(meth)acrylic acid polymer having a degree of neutralization of 20% or lower is preferred from the viewpoint of providing a film excellent in oxygen gas barrier property.

Example 4

Neutralizers (alkalis) shown in Table 4 were separately used to partially neutralize PAA by 5%, 10% or 20%. Aqueous solutions (concentration: 10 wt. %) containing PAA or any one of the partially neutralized products of PAA and the soluble starch in a weight ratio of 70:30 were separately used to form coating films on stretched PET films in the same manner as in Example 1. The thus-formed films were then heat-treated at 200° C. for 15 minutes, thereby producing heat-treated films. The oxygen permeability (at 30° C. and 80% RH) of each of the heat-treated films thus obtained was measured. The results are shown in Table 4

TABLE 4

| Degree of neutralization (%) | Kind of Neutralizer | Composition PAANa/ soluble starch (wt. %) | Oxygen permeability ml(STP)/ m² · day · atm{Pa} (30° C., 80% RH, 3 μm) |
|---|---|---|---|
| 0 | — | 70/30 | 25 |
| 5 | NaOH | 70/30 | 1.4 |
| | LiOH | | 1.2 |
| | KOH | | 1.4 |
| | NH₄OH | | 2.0 |
| 10 | NaOH | 70/30 | 0.2 |
| | LiOH | | 0.2 |

TABLE 4-continued

| Degree of neutralization (%) | Kind of Neutralizer | Composition PAANa/ soluble starch (wt. %) | Oxygen permeability ml(STP)/ m² · day · atm{Pa} (30° C., 80% RH, 3 μm) |
|---|---|---|---|
| 20 | KOH | 70/30 | 0.2 |
|  | NH₄OH |  | 0.4 |
|  | NaOH |  | 320 |
|  | LiOH |  | 320 |
|  | KOH |  | 320 |
|  | NH₄OH |  | 350 |

As apparent from the result shown in Table 4, it is understood that when partially neutralized products of the poly(meth)acrylic acid, which have been obtained by partially neutralizing the poly(meth)acrylic acid with various kinds of alkali metal hydroxides or ammonium hydroxide, to say nothing of unneutralized poly(meth)acrylic acid, are separately used to form dry films from their mixtures with the starch, and the dry films are subjected to the heat treatment, heat-treated films excellent in oxygen gas barrier property can be provided. In particular, when the partially neutralized products having a degree of neutralization of 20% or lower, preferably 15% or lower are used, heat-treated films far excellent in oxygen gas barrier property can be obtained. All the film thus obtained were insoluble in boiling water.

Example 5

The same soluble starch as that used in Example 1 and a 20 wt. % aqueous solution of polymethacrylic acid (AC-30H) (product of NIHON JUNYAKU Co., Ltd., number average molecular weight: 50,000) were used as starch and polymethacrylic acid (PMAA), respectively. A calculated amount of sodium hydroxide was added to the aqueous solution of PMAA to prepare a partially neutralized product (PMAANa) of PMAA having a degree of neutralization of 10%.

An aqueous solution (concentration: 10 wt. %) of a mixture containing PMAA and the soluble starch in a weight ratio of 70:30 and another aqueous solution (concentration: 10 wt. %) containing PMAANa and the soluble starch in a weight ratio of 70:30 were then prepared. Using these aqueous mixture solutions, dry films 3 μm thick were formed in the same manner as in Example 1, and then subjected to a heat treatment at 200° C. for 15 minutes, thereby obtaining heat-treated films.

The film formed of PMAA and the soluble starch had an oxygen permeability (film thickness: 3 μm, 30° C. and 80% RH) of 80 ml(STP)/m²·day·atm{Pa}, while the film formed of PMAANa and the soluble starch had an oxygen permeability (film thickness: 3μm, 30° C. and 80% RH) of 70 ml(STP)/m²·day·atm{Pa}. Both films were insoluble in boiling water.

Example 6

A 25 wt. % aqueous solution of polyacrylic acid (product of Wako Pure Chemical Industries, Ltd., viscosity: 8,000–12,000 cPs at 30° C., number average molecular weight: 150,000) was used as PAA to prepare a 2 wt. % aqueous solution and a 10 wt. % aqueous solution by diluting with water. Sodium hydroxide in calculated amounts to the number of moles of carboxyl groups in PAA was added to the 2 wt. % and 10 wt. % aqueous solutions of PAA to dissolve it in the solutions, thereby preparing aqueous solutions of a partially neutralized product (PAANa) having a degree of neutralization (DN) of 10%.

On the other hand, various kinds of monosaccharides, sugar alcohols and polysaccharides as described below were separately used as a saccharide to prepare 2 wt. % aqueous solutions for sodium alginate, sodium carboxymethyl-cellulose, agarose (for electrophoresis) and pectin (made from apple) among the saccharides described below and 10 wt. % aqueous solutions for other saccharides than these.

(1) Monosaccharides glucose, mannose and galactose (products of Wako Pure Chemical Industries, Ltd.);

(2) Sugar alcohols of monosaccharides sorbitol, mannitol, dulcitol, xylitol, erythritol and glycerol (products of Wako Pure Chemical Industries, Ltd.); and (3) Polysaccharides pullulan, chitosan (water soluble), sodium alginate (viscosity: 100–150 cPs), dextran (number average molecular weight (Mn): 32,000–40,000), dextran (Mn: 60,000–90,000), dextran (Mn: 100,000–200,000), dextran (Mn: 200,000–300,000), agarose (for electrophoresis), pectin (made from apple), poly-β-cyclodextrin, maltose, maltotriose, maltotetraose, maltoheptaose, maltitol and sodium carboxymethylcellulose (all, products of Wako Pure Chemical Industries, Ltd.), galactan (product of Aldrich Chemical Company Inc.), and amyropectin (product of Fluka Chemie AG).

The individual aqueous PAANa solutions thus prepared were then mixed with the individual aqueous solutions of the above-mentioned saccharides in a weight ratio of 70:30 (in terms of solids) to prepare aqueous mixture solutions. Incidentally, the mixing was conducted in such a manner that the aqueous PAANa solution prepared from the 2 wt. % aqueous PAA solution and each of the 2 wt. % aqueous solutions of the saccharides were used to prepare an aqueous mixture solution in a concentration of 2 wt. %, and the aqueous PAANa solution prepared from the 10 wt. % aqueous PAA solution and each of the 10 wt. % aqueous solutions of the saccharides were used to prepare an aqueous mixture solution in a concentration of 10 wt. %.

These aqueous mixture solutions were separately coated by a Meyer bar using a bench coater, K 303 PROOFER (trade name, manufactured by RK Print-Coat Instruments, Ltd.) on stretched PET films (thickness: 16 μm), and water was then evaporated by a dryer, thereby obtaining dry films 3 μm thick. The stretched PET films on which these dry films had been separately formed were fixed to a cardboard with an adhesive vinyl tape to subject them to a heat treatment at 200° C. for 15 minutes in an oven. Oxygen permeability was measured under conditions of 30° C. and 80% RH on the heat-treated films (thickness: 3 μm) thus obtained. The results are shown in Table 5.

TABLE 5

| Monosaccharides and polysaccharides, and sugar alcohols thereof | Oxygen permeability ml(STP)/m² · day · atm{Pa} (30° C., 80% RH, 3 μm) |
|---|---|
| Glucose | 59 |
| Mannose | 104 |
| Galactose | 30 |
| Sorbitol | 4.9 |
| Mannitol | 6.1 |
| Dulcitol | 3.0 |
| Xylitol | 7.6 |
| Erythritol | 6.3 |

TABLE 5-continued

| Monosaccharides and polysaccharides, and sugar alcohols thereof | Oxygen permeability ml(STP)/m² · day · atm{Pa} (30° C., 80% RH, 3 μm) |
|---|---|
| Glycerol | 32 |
| Maltitol | 1.6 |
| Pullulan | 2.6 |
| Chitosan (water soluble) | 2.6 |
| Sodium alginate | 78 |
| Dextran (Mn: 32,000–40,000) | 5.0 |
| Dextran (Mn: 60,000–90,000) | 5.5 |
| Dextran (Mn: 100,000–200,000) | 4.1 |
| Dextran (Mn: 200,000–300,000) | 6.7 |
| Agarose (for electrophoresis) | 120 |
| Pectin (made from apple) | 11 |
| Sodium carboxymethylcellulose | 7.8 |
| Poly-β-cyclodextrin | 2.3 |
| Maltose | 18 |
| Maltotriose | 7.9 |
| Maltotetraose | 4.6 |
| Maltoheptaose | 2.8 |
| Galactan | 44 |
| Amyropectin | 2.9 |

As apparent from the results shown in Table 5, it is understood that when films obtained from the mixtures of PAANa and the individual saccharides of various kinds are subjected to a heat treatment, films excellent in oxygen gas barrier property can be obtained. As conditions for the heat treatment, may be applied the heat-treating conditions used in the case of the starch. All these films were insoluble in boiling water.

We claim:

1. A process for the production of a gas barrier film, which comprises forming a film from a mixture containing (A) at least one poly(meth)acrylic acid polymer selected from the group consisting of poly(meth)acrylic acid and partially neutralized products of poly(meth)acrylic acid and (B) a saccharide in a weight ratio of 95:5 to 20:80, and then subjecting the film to a heat treatment under conditions in which the heat-treating temperature and the heat-treating time satisfy the following relationships (a) and (b):

(a) $\log t \geq -0.0622 \times T + 28.48$ (b) $373 \leq T \leq 573$ wherein t means the heat-treating time (min), and T denotes the heat-treating temperature (K).

2. The process as claimed in claim 1, wherein the poly(meth)acrylic acid is polyacrylic acid, polymethacrylic acid, a copolymer of acrylic acid and methacrylic acid, or a mixture of at least two polymers thereof, and has a number average molecular weight ranging from 2,000 to 250,000.

3. The process as claimed in claim 1, wherein the partially neutralized product of the poly(meth)acrylic acid is obtained by partially neutralizing carboxyl groups of the poly(meth)acrylic acid with an alkali.

4. The process as claimed in claim 1, wherein the partially neutralized product of the poly(meth)acrylic acid has a degree of neutralization within a range higher than 0%, but not higher than 20%, said degree of neutralization being determined by the following equation:

Degree of neutralization = $(X/Y) \times 100$ wherein X means the number of moles of carboxyl groups neutralized in 1 g of the partially neutralized poly(meth)acrylic acid, and Y denotes the number of moles of carboxyl groups in 1 g of the poly(meth)acrylic acid before the partial neutralization.

5. The process as claimed in claim 1, wherein the saccharide is at least one selected from the group consisting of monosaccharides, sugar alcohols, oligosaccharides and polysaccharides.

6. The process as claimed in claim 1, wherein the saccharide is soluble in water.

7. The process as claimed in claim 1, wherein the polysaccharide is starch.

8. The process as claimed in claim 1, wherein the starch is modified starch soluble in water.

9. The process as claimed in claim 1, wherein the film is formed from a mixture containing the poly(meth)acrylic acid polymer and the saccharide in a weight ratio of 90:10 to 40:60.

10. The process as claimed in claim 1, wherein the film is formed from a mixture containing the poly(meth)acrylic acid polymer and the saccharide in a weight ratio of 85:15 to 50:50.

11. A process for the production of a gas barrier film, which comprises forming a film from a mixture containing (A) at least one poly(meth)acrylic acid polylmer selected from the group consisting of poly(meth)acrylic acid and partially neutralized products of poly(meth)-acrylic acid and partially neutralized products of poly(meth)-acrylic acid and (B) a saccharide in a weight ratio of 95:5 to 20:80, and then subjecting the film to a heat treatment under conditions in which the heat-treating temperature and the heat-treating time satisfy the following relationships (c) and (b):

(c) $\log t \geq -0.0631 \times T + 29.32$ (b) $373 \leq T \leq 573$ wherein t means the heat-treating time (min), and T denotes the heat-treating temperature (°K).

12. A process for the production of a gas barrier film, which comprises forming a film of a mixture containing (A) at least one poly(meth)acrylic acid polymer selected from the group consisting of poly(meth)acrylic acid and partially neutralized products of poly(meth)-acrylic acid and (B) a saccharide in a weight ratio of 95:5 to 20:80, and then subjecting the film to a heat treatment under conditions in which the heat-treating temperature and the heat-treating time satisfy the following relationships (d) and (b):

(d) $\log t \geq -0.0645 \times T + 30.71$ (b) $373 \leq T \leq 573$ wherein t means the heat-treating time (min), and T denotes the heat-treating temperature (°K).

* * * * *